(12) United States Patent
Im

(10) Patent No.: US 11,231,521 B2
(45) Date of Patent: Jan. 25, 2022

(54) METHOD AND SERVER FOR SUPPORTING AVIATION SAFETY

(71) Applicant: Korea Oceanic and Atmospheric System Technology (KOAST), Seoul (KR)

(72) Inventor: Hyo Hyuc Im, Seoul (KR)

(73) Assignee: Korea Oceanic and Atmospheric System Technology (KOAST), Seoul (KR)

( * ) Notice: Subject to any disclaimer, the term of this patent is extended or adjusted under 35 U.S.C. 154(b) by 113 days.

(21) Appl. No.: 16/620,218

(22) PCT Filed: May 31, 2018

(86) PCT No.: PCT/KR2018/006250
§ 371 (c)(1),
(2) Date: Dec. 6, 2019

(87) PCT Pub. No.: WO2018/225986
PCT Pub. Date: Dec. 13, 2018

(65) Prior Publication Data
US 2020/0142096 A1    May 7, 2020

(30) Foreign Application Priority Data
Jun. 8, 2017 (KR) .......... 10-2017-0071396

(51) Int. Cl.
*G01W 1/10* (2006.01)
*G06N 20/00* (2019.01)
(Continued)

(52) U.S. Cl.
CPC ............ *G01W 1/10* (2013.01); *G01W 1/02* (2013.01); *G06N 20/00* (2019.01); *G08G 5/0013* (2013.01); *G08G 5/0021* (2013.01); *H04L 67/12* (2013.01)

(58) Field of Classification Search
None
See application file for complete search history.

(56) References Cited

U.S. PATENT DOCUMENTS

| 7,081,834 B2 * | 7/2006 | Ruokangas | G01W 1/02 340/601 |
| 2010/0103029 A1 * | 4/2010 | Khatwa | G01S 13/953 342/26 B |
| 2016/0306075 A1 | 10/2016 | Heng et al. | |

FOREIGN PATENT DOCUMENTS

| JP | 2013054005 A | 3/2013 |
| JP | 2015056055 A | 3/2015 |

(Continued)

OTHER PUBLICATIONS

Wolfson et al. Automated Microburst Wind-Shear Prediction, 1994 The Lincoln Laboratory Journal, vol. 7, No. 2 (Year: 1994).*

*Primary Examiner* — Roy Y Yi
(74) *Attorney, Agent, or Firm* — Husch Blackwell LLP

(57) ABSTRACT

Disclosed in present invention are a method for supporting aviation safety and a server for same, the method comprising the steps of: (a) the server for supporting aviation safety obtaining observation data measured from each of a plurality of weather observation apparatuses located in a specific zone; and (b) the server for supporting aviation safety predicting the weather state in the specific zone at a certain time after the current time by analyzing a generated map by referencing a machine learning database.

24 Claims, 4 Drawing Sheets

(51) Int. Cl.
  *G01W 1/02* (2006.01)
  *G08G 5/00* (2006.01)
  *H04L 29/08* (2006.01)

(56) References Cited

FOREIGN PATENT DOCUMENTS

| KR | 1020150054584 A | 5/2015 |
| KR | 1020160072432 A | 6/2016 |
| KR | 101655776 B1 | 9/2016 |
| KR | 1020160134107 A | 11/2016 |

\* cited by examiner

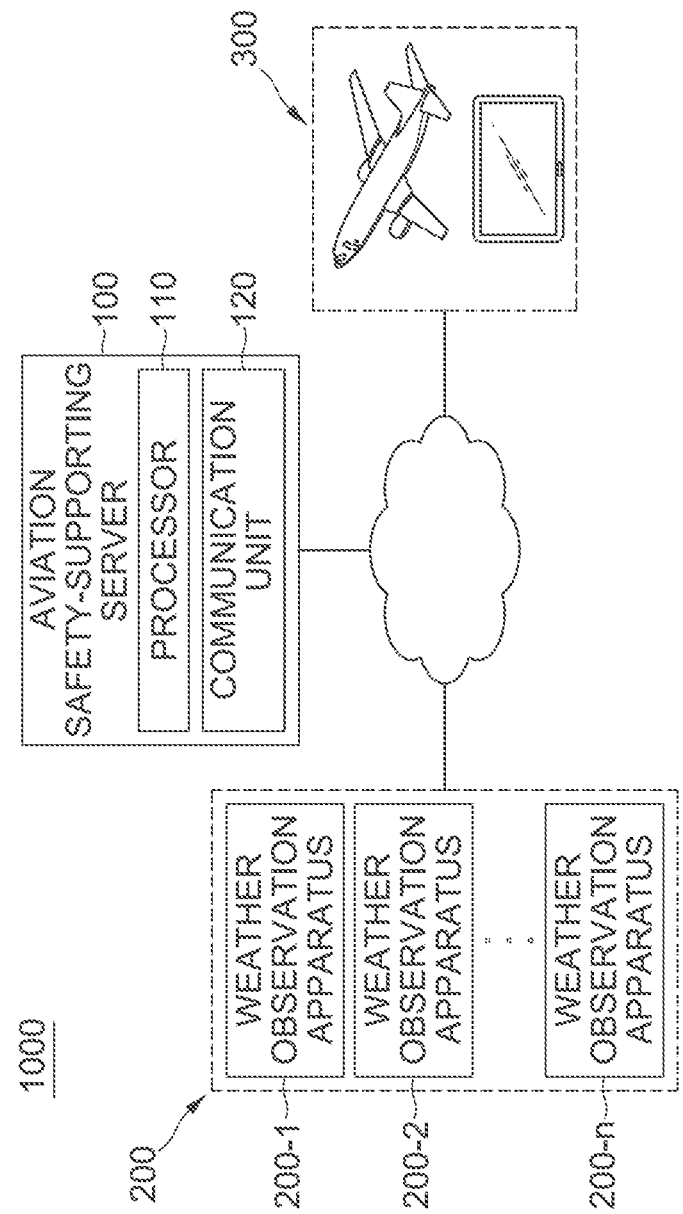

METHOD AND SERVER FOR SUPPORTING AVIATION SAFETY

CROSS REFERENCE TO RELATED APPLICATIONS

This application is a U.S. National Phase Application of International Application No. PCT/KR2018/006250 filed on May 31, 2018, which claims the benefit of priority from Korean Patent Application 10-2017-0071396 filed Jun. 8, 2017. The disclosures of International Application No. PCT/KR2018/006250 and Korean Patent Application 10-2017-0071396 are incorporated herein by reference.

FIELD OF THE DISCLOSURE

The present disclosure relates to a method for supporting aviation safety and a server using the same; and more particularly to, the method for regularly or irregularly obtaining observation data measured from a plurality of weather observation apparatuses that are located in a specific zone and that are placed having relative positioning with each other with a specified spacing; and preparing and managing the obtained observation data as a map by referring to information on the relative positioning, and analyzing the prepared map by referring to machine learning database, thereby predicting condition in the specific zone at a future time coming after a certain period of time from a current time, and the server using the same.

BACKGROUND OF THE DISCLOSURE

Wind shear is one of the main causes of most of aviation accidents that occur when airplanes take off and land. The wind shear means a sudden change in wind, and when wind shear occurs, an airplane that enters a runway is affected by abnormally increased lift force due to crosswind at an early stage and then suddenly loses the lift force due to strong rear-flank downdraft. As such, if airplane pilots receive information on a predicted hazardous weather condition giving a disastrous effect on safety at a scheduled time of the airplane taking off or landing no later than 10 minutes before taking off or landing, risks of aviation accidents may be significantly reduced. Because current aviation weather observation apparatuses and equipment such as LLWAS, TDWR, AMOS, etc. to predict hazardous weather conditions are expensive, it is, however, costly to equip a lot of apparatuses and equipment in the aspect of operating airports. Therefore, it is difficult to raise reliability of a predicting system because the predicting system is implemented only with a few apparatuses and equipment.

SUMMARY OF THE DISCLOSURE

It is an object of the present disclosure to solve all problems explained above.

It is another object of the present disclosure to prevent an aviation accident by transmitting a predicted hazardous weather condition at a scheduled time of taking off or landing to an airplane to take off from, or land on, an airport.

It is still another object of the present disclosure to increase reliability while using less costly weather observation apparatuses.

In order to accomplish objects above, representative structures of the present disclosure are described as follows.

In accordance with one aspect of the present disclosure, there is provided a method for supporting aviation safety, including steps of: (a) an aviation safety-supporting server regularly or irregularly obtaining observation data measured from a plurality of weather observation apparatuses that are located in a specific zone and that are placed having relative positioning with each other with a specified spacing; and (b) the aviation safety-supporting server preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time.

In accordance with another aspect of the present disclosure, there is provided an aviation safety-supporting server, including: a communication unit regularly or irregularly obtaining observation data measured from a plurality of weather observation apparatuses that are located in a specific zone and that are placed having relative positioning with each other with a specified spacing; and a processor preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time.

In addition, other methods, devices, systems, and recordable media readable by a computer for storing a computer program to execute the method of the present disclosure are further provided.

BRIEF DESCRIPTION OF THE DRAWINGS

FIG. 1 is a block diagram of a whole system including an aviation safety-supporting server in accordance with one example embodiment of the present disclosure.

DETAILED DESCRIPTION OF THE PREFERRED EMBODIMENTS

Figure 2A:
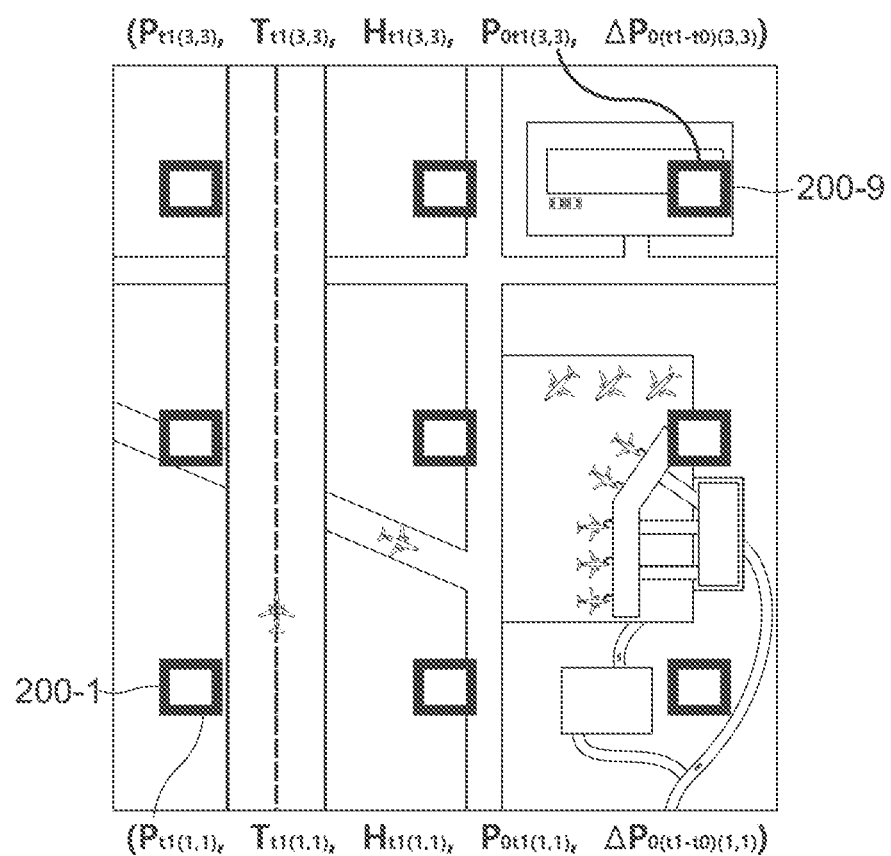
FIGS. 2A and 2B are exemplary diagrams illustrating data managed in each of maps by each of weather observation apparatuses placed in a specific zone in accordance with one example embodiment of the present disclosure.

Detailed explanations of the present disclosure explained below refer to attached drawings that illustrate specific embodiment examples of this present that may be executed. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure.

In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present disclosure pertains to implement the present disclosure, detailed explanation on desirable embodiment examples of the present disclosure will be made by referring to attached drawings.

FIG. 1 illustrates a block diagram of a whole system 1000 including an aviation safety-supporting server 100 in accordance with one example embodiment of the present disclosure.

By referring to FIG. 1, the whole system 1000 in accordance with the present disclosure may include the aviation safety-supporting server 100, weather observation apparatuses 200, an airplane 300, etc.

Besides, the aviation safety-supporting server 100 may include a processor 110 and a communication unit 120.

The aviation safety-supporting server 100 in the present disclosure may prevent an aviation accident by transmitting information on a predicted hazardous weather condition at a scheduled time of taking off or landing to the airplane 300 which is going to take off from or land on an airport.

More specifically, the communication unit 120 plays a role of regularly or irregularly obtaining observation data measured from a plurality of weather observation apparatuses 200 that are located in a specific zone. Herein, the observation data may include atmospheric pressure data, temperature data, humidity data, etc.

Meanwhile, the weather observation apparatuses 200 to be explained later may be placed having relative positioning with each other with a specified spacing. As exemplarily illustrated in FIGS. 2A and 2B, they may be placed in the specific zone like an airport on a grid, but the scope of the present disclosure is not limited thereto. They could be placed in an irregular pattern depending on topographic or weather characteristics, etc.

In addition, the weather observation apparatuses 200 may be fixed on immovable rods or attached to portable objects, and as the case may be, at least some of the weather observation apparatuses 200 may be user terminals in which one or more sensors and one or more application programs are installed. The detailed configuration and functions of the weather observation apparatuses 200 will be explained later by referring to FIG. 3.

Next, the processor 110 may perform a process of preparing and managing the obtained observation data as a map by referring to information on the relative positioning. Herein the map may refer to a set of data which have relationships between (i) time information of the observation data obtained from the weather observation apparatuses 200 placed having the relative positioning with each other with the specified spacing, i.e., information on time when the weather observation apparatuses acquire the observation data, and (ii) location information, i.e., information on absolute or relative locations where the weather observation apparatuses obtain the observation data.

More specifically, the processor 110 may calculate atmospheric pressure data at sea level by referring to (i) the atmospheric pressure data, the temperature data, and the humidity data obtained from the weather observation apparatuses 200 having the relative positioning with each other through the communication unit 120, and (ii) height data of each of the weather observation apparatuses 200. Herein, the height data would include DEM height data at latitudes and longitudes of the weather observation apparatuses 200.

The atmospheric pressure data at sea level is calculated because the atmospheric pressure changes depending on the measured height. Accordingly, it is necessary to correct the sea level by using the following formula, where $P_0$ is atmospheric pressure at sea level (hPa); P is observed atmospheric pressure (hPa); h is height (m); and T is temperature (° C.):

$$P_0 = P\left(1 - \frac{0.0065h}{T + 0.0065h + 273.15}\right)^{-5.257}$$
$$= 0.03414 \times \frac{Ph}{(273 + T)}$$

The information on the atmospheric pressure data at sea level may include variation of atmospheric pressure at sea level obtained by dividing a difference between value of first atmospheric pressure data at sea level at t1 and that of second atmospheric pressure data at sea level at t2 by a time interval (t2−t1).

$$\Delta P_0 = \frac{P_{0t2} - P_{0t1}}{t2 - t1}$$

Herein, upon measuring observation factors such as atmospheric pressure, when it is intended to obtain a more accurate absolute value at a certain time, measuring instruments tend to become more expensive. Contrarily, the whole system 1000 in the present disclosure may obtain reliability as good as those of existing expensive instruments without using the existing expensive instruments by (i) measuring atmospheric pressure, temperature, and humidity with the weather observation apparatuses 200 that have relatively cheap and simple configurations, and (ii) calculating and managing variation of the atmospheric pressure at sea level for a certain period of time with the measured atmospheric pressure at sea level, i.e., calculating and managing relative value of the atmospheric pressure rather than its absolute value thereof. Besides, much more weather observation apparatuses 200 in accordance with the present disclosure may be installed compared to the existing expensive instruments because they are less expensive. This may reduce the costs of implementing a weather predicting system and increase its reliability in accordance with the present disclosure.

Next, by referring to FIGS. 2A and 2B, examples of data obtained and managed by each of the weather observation apparatuses located in the specific zone will be explained. More specifically, the atmospheric pressure data, the temperature data, the humidity data, the atmospheric pressure data at sea level and information on variations of the atmospheric pressure at sea level at each of corresponding locations of each of the weather observation apparatuses 200 may be managed.

By referring to FIG. 2A, it can be found at a time t1 that atmospheric pressure data $P_{t1(1,1)}$, temperature data $T_{t1(1,1)}$, humidity data $H_{t1(1,1)}$, atmospheric pressure data at sea level $P_{0t1(1,1)}$, a variation $\Delta P_{0(t1-t0)(1,1)}$ of atmospheric pressure at sea level, wherein t0 means a specific time before t1, etc. measured from a weather observation apparatus 200-1, atmospheric pressure data $P_{t1(3,3)}$, temperature data $T_{t1(3,3)}$, humidity data $H_{t1(3,3)}$, atmospheric pressure data at sea level $P_{0t1(3,3)}$, a variation $\Delta P_{0(t1-t0)(3,3)}$ of atmospheric pressure at sea level, etc. measured from a weather observation apparatus 200-9, etc. are managed.

Figure 2B:
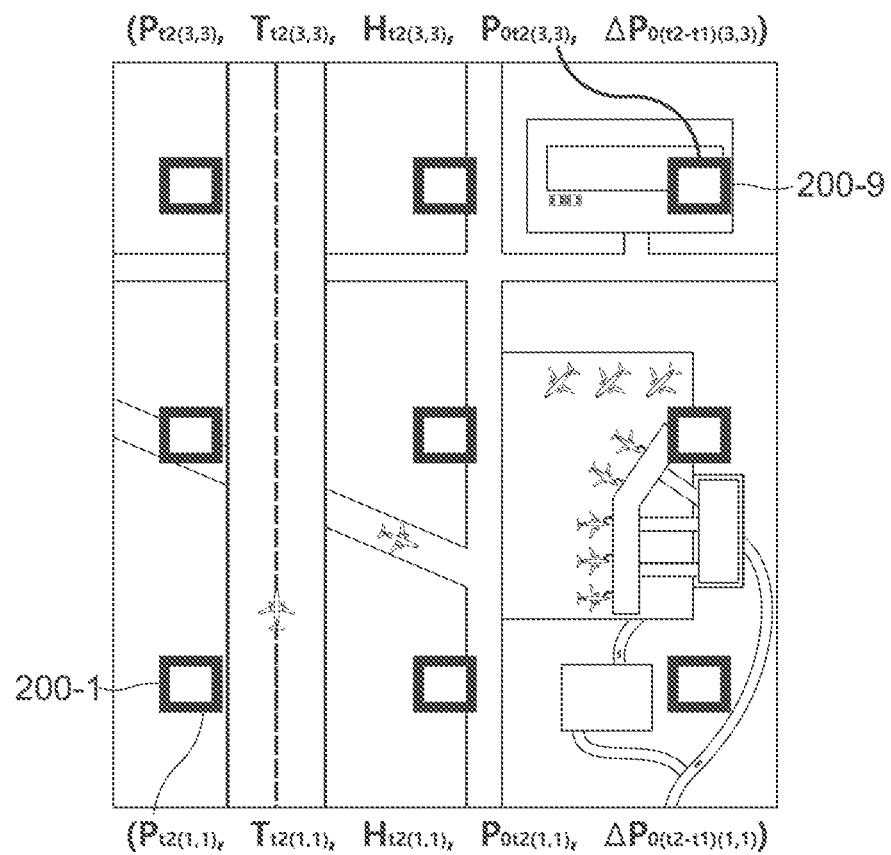

Furthermore, by referring to FIG. 2B, it can be found at a time t2 after a certain period of time from the time t1 that atmospheric pressure data $P_{t2\,(1,1)}$, temperature data $T_{t2(1,1)}$, humidity data $H_{t2(1,1)}$, atmospheric pressure data at sea level $P_{0t2(1,1)}$, variation $\Delta P_{0(t2-t1)(1,1)}$ of atmospheric pressure at sea level, . . . measured from a weather observation apparatus 200-1, atmospheric pressure data $P_{t2(3,3)}$, temperature data $T_{t2(3,3)}$, humidity data $H_{t2(3,3)}$, atmospheric pressure data at sea level $P_{0t2(3,3)}$, variation $\Delta P_{0(t2-t1)(3,3)}$ of atmospheric pressure at sea level, . . . measured from a weather observation apparatus 200-9, etc. are managed.

By analyzing the prepared map by referring to machine learning database, the processor 110 may perform a process of predicting the weather condition in the specific zone at a future time coming after a certain period of time from a current time. If a changing pattern of the data in the specific zone managed in the prepared map from 10 minutes ago to the current time is similar to patterns of previous hazardous weather conditions stored in the machine learning database or learned patterns of hazardous weather conditions highly possible to occur, it could be predicted that the hazardous weather condition could occur in the specific zone 10 minutes later.

Herein, the explanation assumed that a future weather condition is predicted by using the weather observation apparatuses 200, but it is not limited to this. Only one of the weather observation apparatuses 200 could be used to predict the future weather condition.

Next, the machine learning database may be created by learning previous observation data in the specific zone. It may refer to each of observation data observed from at least one of the weather observation apparatuses 200, Low Level Windshear Alert System (LLWAS), Terminal Doppler Weather Radar (TDWR), Aerodrome Meteorological Observation System (AMOS), and Automated Weather Station (AWS), but it is not limited to these. Only with the weather observation apparatuses 200, the machine learning database could be implemented.

Besides, the machine learning database could be created by learning previous observation data observed in the specific zone and airflow data in the specific zone corresponding to the previous observation data. Herein, upon learning the airflow data, the machine learning database could automatically analyze hazardous weather conditions that had not been predicted by predicting large-scale fluid movement in combination of various weather observation data through deep learning and improving an error level by using compared data between predicted machine learning values and their corresponding actually measured values, and provide short-term predicted information in real time in connection with a numerical model.

Meanwhile, the processor 110 may transmit the predicted weather condition at the future time coming after the certain period of time from the current time to an airplane 300 to take off from, or land on, the specific zone or to a terminal 300 to enter, or leave from, the specific zone, through the communication unit 120.

If wind shear is predicted to occur 10 minutes later on a runway, the processor 110 of the aviation safety-supporting server 100 located in a control center may support pilots of an airplane 300 to prevent an accident by transmitting the prediction to the airplane 300 which is going to land on the runway 10 minutes later. In addition, the prediction could be transmitted even to a terminal 300 of an operator or as a work vehicle 300 that is working on the runway to predict a risk in advance and provide against the risk.

Herein, the processor 110 could visualize in a 3D model not only the predicted hazardous weather condition information but also atmospheric streamline in the specific zone in real time and at the future time coming after the certain period of time from the current time.

Meanwhile, this explanation was assumed that the weather conditions are predicted in the airport and on the runway, but it is not limited to this. If a tsunami is predicted to hit a coast in an area, the hazardous condition could be informed of user terminals 300 at the specific zone or if a gust or a storm is predicted to occur at a golf field, the hazardous condition could be informed of user terminals 300 at the golf field. Like these, the present disclosure could be implemented to predict weather conditions at various places and give warnings.

As another example, it could be assumed that each of the weather observation apparatuses 200 has the machine learning database or is linked to the machine learning database. In the case, instead of the processor 110, the weather observation apparatuses 200 themselves could analyze their own observation data measured by themselves by referring to the machine learning database, thereby predicting a future weather condition. Herein, if a hazardous weather condition is predicted, it would be also possible to inform the airplane 300 or people around it of a risk through an indicator such as a loud alarm or LED lighting.

In accordance with one example embodiment of the present disclosure, it could be assumed that the machine learning database could further include reference data created by learning previous observation data in each of multiple zones.

Herein, on assumption that the specific zone where the weather observation apparatuses 200 are placed is a first zone, and a zone adjacent to the first zone is a second zone, the processor 110 could prepare and manage observation data obtained as a map from the first zone and analyze the prepared map by referring to the reference data of the machine learning database, thereby predicting a weather condition in the second zone at the future time coming after the certain period of time from the current time.

If a zone adjacent to an airport is the first zone and the airport is the second zone, even though it is impossible to install the weather observation apparatuses 200 in the airport, it would be possible to analyze a weather condition in the first zone near the airport by referring to the machine learning database created by learning previous weather observation data in the multiple zones and predict even the weather condition of the second zone airport near the first zone.

Herein, the relative positioning between the first zone and the second zone may have a boundary between the two zones or part of the first zone could be included in the second zone.

Meanwhile, the processor 110 could support each of the weather observation apparatuses 200 to be placed at each of locations whose error rate is analyzed to be equal to or less than a preset scope to predict the weather condition in the specific zone by referring to reference data of the machine learning database. In other words, it could be possible to increase accuracy upon predicting a weather condition in the specific zone by placing the weather observation apparatuses 200 on each of locations analyzed to be appropriate to predict the weather condition.

Herein, the error rate may be calculated by comparing previously predicted weather information and its corresponding actually observed weather information at a previous time corresponding to the previously predicted weather information.

Furthermore, while a weather condition is predicted in the specific zone after each of the weather observation apparatuses 200 has been placed, if the error rate exceeds the preset scope, the processor 110 may support locations of the weather observation apparatuses 200 which have been placed in the specific zone to be newly adjusted by referring to the reference data of the machine learning database, thereby increasing accuracy.

Next, explanation will be given on detailed configuration of each of the weather observation apparatuses 200 in accordance with one example embodiment of the present disclosure by referring to FIG. 3.

In accordance with the present disclosure, the weather observation apparatuses 200 may correspond to meteorological instruments placed at places in the specific zone to measure a weather environment in the specific zone and perform a process of measuring the weather environment at the current time and providing it to the aviation safety-supporting server 100.

Each of the weather observation apparatuses 200 may include a sensor unit not illustrated herein and a measuring value-determining unit not illustrated herein. For reference, each of the weather observation apparatuses 200 may further include a control unit.

The sensor unit may include multiple types of sensors that produce measuring values by measuring items such as wind direction, wind velocity, temperature, humidity, atmospheric pressure, illuminance, etc. in the weather environment and at least some of sensors, among the multiple types of sensors, may be configured with the same type of sensors.

Figure 3:
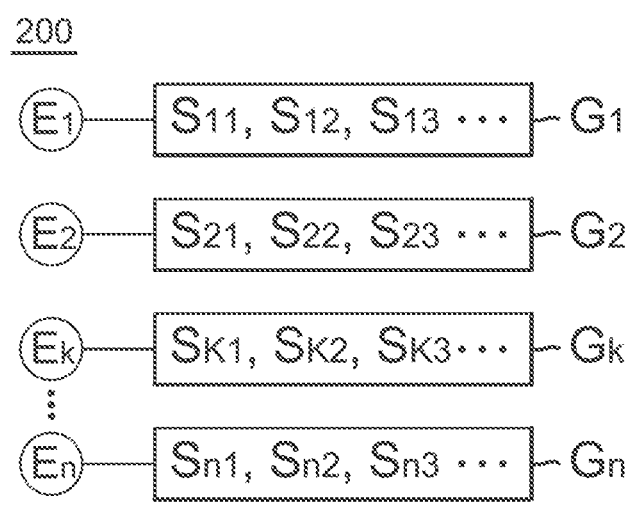
FIG. 3 is a detailed block diagram of a weather observation apparatus in accordance with one example embodiment of the present disclosure.

More specifically, as illustrated in FIG. 3, on assumption that measuring items in the weather environment are E1, E2, ..., Ek, ..., En, the sensor unit may be configured to include a sensor group G1 for measuring the measuring item E1 having at least three sensors, a sensor group G2 for measuring the measuring item E2 having at least three sensors, a sensor group Gk for measuring the measuring item Ek having at least three sensors, and a sensor group Gn for measuring the measuring item En having at least three sensors.

In the explanation, for example, the sensor group G1 has S11, S12, and S13; the sensor group G2 has S21, S22, and S23; the sensor group Gk has Sk1, Sk2, and Sk3; and the sensor group Gn has Sn1, Sn2, and Sn3, but they are not limited to these. Each sensor group is indicated as a sensor group when the sensor group has at least three sensors for the same measuring item and it is not necessary to make the number of sensors identical by each sensor group.

Measuring values generated at a particular time or a time close to the particular time by sensors included in a specified sensor group may be compared with one another by the measuring value-determining unit.

By relatively comparing measuring values of sensors included in the specified sensor group with each other, the measuring value-determining unit may remove a specific measuring value beyond certain error range in consideration of mean value or standard deviation of the measuring values and transmit to the aviation safety-supporting server 100, only the rest of measuring values in the error range to be used for statistical treatment. Herein, if the mean value of all the measuring values is within the error range, all could be obtained and if the standard deviation of all the measuring values becomes large, all could be removed.

Meanwhile, the measuring value-determining unit may absolutely compare the measuring values of the sensors included in the specified sensor group. In this case, if temporal transition of the specific measuring value satisfies predetermined conditions, e.g., if the measuring values by the passage of time discontinuously changes in excess of the preset level or do not change during the predetermined time section, they could be considered to be beyond the error range. Therefore, the specific measuring value could be removed and the rest of the measuring values could be obtained and transmitted to the aviation safety-supporting server 100 to be used for statistical treatment.

In addition, the measuring value-determining unit may obtain a selected measuring value for the measuring item E1 by referring to the rest of measuring values except a specific measuring value by a specific sensor, that is beyond error range, among at least three sensors S11, S12, and S13 included in the sensor group G1, and obtain a selected measuring value for the measuring item E2 by referring to the rest of measuring values except a specific measuring value by a specific sensor, that is beyond error range, among at least three sensors S21, S22, and S23 included in the sensor group G2.

To this end, the measuring value-determining unit may obtain a selected measuring value for the measuring item Ek by referring to the rest of measuring values except a specific measuring value by a specific sensor, that is beyond error range, among at least three sensors Sk1, Sk2, and Sk3 included in the sensor group Gk, and obtain a selected measuring value for the measuring item En by referring to the rest of measuring values except a specific measuring value by a specific sensor, that is beyond error range, among at least three sensors Sn1, Sn2, and Sn3 included in the sensor group Gn.

If the specific measuring value and the like beyond the error range continuously occurs for a certain period of time or exceeds a certain rate, the specific sensor may be replaced with a new sensor by regarding it as a faulty sensor. After the replacement with the new sensor, if there is any difference between a new measuring value of the new sensor and that of the existing sensor by comparing the new measuring value of the new sensor with that of the existing sensor, the measuring value-determining unit may adjust the new measuring value obtained by the new sensor by using the measuring values of the existing sensors.

In short, if the measuring value-determining unit compares measuring values of sensors belonging to a specified sensor group Gk with each other and there continues to be any difference between a specific measuring value of a specific sensor belonging thereto and the rest of measuring values of the rest of sensors by more than certain values or a certain rate, the measuring value-determining unit may consider the specific sensor which generates the different measuring value as a sensor to be replaced. After the replacement of the specific sensor with the new sensor, the measuring value-determining unit may adjust the new measuring value of the new sensor by using the measuring values of the existing sensors belonging to the specified sensor group Gk as reference data and make the new sensor obtain the new measuring value. Herein, during the course of replacing the specific sensor with the new sensor, an alert unit, not illustrated, may produce an alert signal to make the specific sensor replaced.

More specifically, if a specific measuring value beyond the error range among the measuring values of at least three sensors Sk1, Sk2, and Sk3 included in the specified sensor group Gk continuously occurs or exceeds a preset rate, the alert unit may generate an alert signal to lead replacement of the specific sensor.

As shown above, while obtaining the measuring values, the measuring value-determining unit may manage, or cause the aviation safety-supporting server 100 to manage, the obtained measuring values together with the information on locations corresponding to the obtained measuring values. To do this, the weather observation apparatuses 200 in accordance with the present disclosure may further include a GPS module unit, not illustrated, to get, from GPS, information on coordinates of the current point where the aviation safety-supporting server is located.

A GPS module unit may transmit information on the location where the weather observation apparatuses obtain the observation data and information on time corresponding to the location to the measuring value-determining unit. Herein, the measuring value-determining unit may synchronize to make the time information at the time of generating the measuring values identical to the information on the time delivered from the GPS module unit.

If the time when the measuring value is obtained by the measuring value-determining unit is different from the time when the location information is obtained by the GPS module unit, a variety of examples including the synchronization of the time through the method such as interpolation, etc. are introduced by referring to the time of obtaining the information around the area.

Meanwhile, a measuring value obtained by the measuring value-determining unit and information on the location corresponding to the measuring value obtained thereby, and synchronized time information may be transmitted to the aviation safety-supporting server 100 by the communication unit, not illustrated. In other words, the communication unit may provide, to the aviation safety-supporting server 100, measuring values of E1, E2, . . . , En as measuring items obtained by the measuring value-determining unit, the information on the location and the time corresponding thereto.

In accordance with the present disclosure, aviation accidents may be prevented by transmitting a predicted hazardous weather condition at a scheduled time of taking off or landing to an airplane to take off from, or land on, an airport.

Besides, the present disclosure may increase reliability while using less costly weather observation apparatuses.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs.

Program commands include not only a machine language code made by a complier but also a high-level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:
1. A method for supporting aviation safety, comprising:
 (a) an aviation safety-supporting server regularly or irregularly obtaining observation data measured from a plurality of weather observation apparatuses that are located in a specific zone and that are placed having relative positioning with each other with a specified spacing; and
 (b) the aviation safety-supporting server preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;
 wherein the observation data includes atmospheric pressure data, temperature data, and humidity data;
 wherein atmospheric pressure data at sea level is calculated by referring to (i) the atmospheric pressure data, the temperature data, and the humidity data obtained from the weather observation apparatuses having the relative positioning with each other, and (ii) height data of each of the weather observation apparatuses; and
 wherein the map manages information on the atmospheric pressure data, the temperature data, the humidity data, and the atmospheric pressure data at sea level at each of corresponding locations of each of the weather observation apparatuses.

2. The method of claim 1, after the step of (b), comprising a step of:
 (c) the aviation safety-supporting server transmitting the predicted weather condition at the future time coming after the certain period of time from the current time to an airplane to take off from, or land on, the specific zone or to a terminal to enter, or leave from, the specific zone.

3. The method of claim 1, wherein the information on the atmospheric pressure data at sea level includes variation of atmospheric pressure at sea level obtained by dividing a difference between value of first atmospheric pressure data at sea level at t1 and that of second atmospheric pressure data at sea level at t2 by a time interval (t2−t1) and wherein the map manages the variation of the atmospheric pressure at sea level.

4. The method of claim 1, wherein the machine learning database refers to each of the observation data acquired from at least one of the weather observation apparatuses, Low Level Windshear Alert System (LLWAS), Terminal Doppler Weather Radar (TDWR), Aerodrome Meteorological Observation System (AMOS), and Automated Weather Station (AWS).

5. The method of claim 1, wherein the machine learning database is created by learning the previous observation data observed in the specific zone and airflow data in the specific zone corresponding to the previous observation data.

6. The method of claim 1, wherein at least some of the weather observation apparatuses are at least one of user terminals in which one or more sensors and application programs are installed.

7. A method for supporting aviation safety, comprising:
(a) an aviation safety-supporting server regularly or irregularly obtaining observation data measured from a plurality of weather observation apparatuses that are located in a specific zone and that are placed having relative positioning with each other with a specified spacing; and
(b) the aviation safety-supporting server preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;
wherein each of the weather observation apparatuses includes:
a sensor unit, on assumption that at least one of all measuring items is E1, E2, . . . , En and a sensor group for measuring the measuring item E1 is G1, that for measuring the measuring item E2 is G2, and that for measuring the measuring item En is Gn, which is configured to include the sensor group G1 having at least three sensors S11, S12, and S13, the sensor group G2 having at least three sensors S21, S22, and S23, and the sensor group Gn having at least three sensors Sn1, Sn2, and Sn3; and
a measuring value-determining unit for obtaining a selected measuring value for the measuring item E1 by referring to the rest of measuring values except a specific measuring value by a specific sensor, that is beyond error range, among at least three sensors S11, S12, and S13 included in the sensor group G1, obtaining a selected measuring value for the measuring item E2 by referring to the rest of measuring values except a specific measuring value by a specific sensor, that is beyond error range, among at least three sensors S21, S22, and S23 included in the sensor group G2, and obtaining a selected measuring value for the measuring item En by referring to the rest of measuring values except a specific measuring value by a specific sensor, that is beyond error range, among at least three sensors Sn1, Sn2, and Sn3 included in the sensor group Gn.

8. The method of claim 7, wherein, when k is an integer as one of numbers from 1 to n, if the specific sensor in the sensor group Gk beyond the error range is replaced with a new sensor and there is a difference between a new measuring value obtained by the new sensor and all the measuring values of the existing sensors belonging to the sensor group Gk by more than a certain number of rate, the measuring value-determining unit obtains an adjusted measuring value by adjusting the new measuring value by using all the measuring values of the existing sensors belonging to the sensor group Gk as reference data.

9. The method of claim 7, wherein the several weather observation apparatuses further includes an alarm unit for providing information to lead a specific sensor beyond error range among at least three sensors Sk1, Sk2, and Sk3 included in the sensor group Gk to be replaced, wherein k is an integer as one of numbers from 1 to n, if the specific measuring value of the specific sensor beyond the error range lasts for more than a certain period of time or is continuously equal to, or exceeds, prefixed ratio within a certain time section.

10. A method for supporting aviation safety, comprising:
(a) an aviation safety-supporting server regularly or irregularly obtaining observation data measured from a plurality of weather observation apparatuses that are located in a specific zone and that are placed having relative positioning with each other with a specified spacing; and
(b) the aviation safety-supporting server preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;
wherein the machine learning database further includes reference data created by learning previous observation data observed in each of multiple zones; and
wherein, if a zone where a plurality of weather observation apparatuses are placed is a first zone and a zone adjacent to the first zone is a second zone, the aviation safety-supporting server prepares and manages the observation data obtained from the first zone as a map, and analyzes the prepared map by referring to the reference data of the machine learning database, thereby predicting weather condition of the second zone at the future time coming after the certain period of time from the current time.

11. A method for supporting aviation safety, comprising:
(a) an aviation safety-supporting server regularly or irregularly obtaining observation data measured from a plurality of weather observation apparatuses that are located in a specific zone and that are placed having relative positioning with each other with a specified spacing; and
(b) the aviation safety-supporting server preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;
wherein the machine learning database further includes reference data created by learning previous observation data observed in each of multiple zones; and
wherein the aviation safety-supporting server supports each of the weather observation apparatuses to be placed at each location where error rate, calculated by comparing the previously predicted weather information with actually observed weather information at a previous time corresponding to the previously predicted weather information, is analyzed to be equal to or less than a preset scope, by referring to the reference data of the machine learning database.

12. The method of claim 11, wherein, while a weather condition is predicted in the specific zone after each of the weather observation apparatuses is placed, if the error rate exceeds the preset scope, the aviation safety-supporting server supports each of locations of each of the weather observation apparatuses in the specific zone to be adjusted by referring to the reference data of the machine learning database.

13. An aviation safety-supporting server, comprising:
a communication unit regularly or irregularly obtaining observation data measured from a plurality of weather observation apparatuses that are located in a specific zone and that are placed having relative positioning with each other with a specified spacing; and
a processor preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;
wherein the observation data includes atmospheric pressure data, temperature data, and humidity data
wherein the processor calculates atmospheric pressure data at sea level by referring to (i) the atmospheric pressure data, the temperature data, and the humidity data obtained through the communication unit from the weather observation apparatuses having the relative positioning with each other, and (ii) height data of each of the weather observation apparatuses; and
wherein the map manages information on the atmospheric pressure data, the temperature data, the humidity data, and the atmospheric pressure data at sea level at each of corresponding locations of each of the weather observation apparatuses.

14. The aviation safety-supporting server of claim 13, wherein the processor transmits the predicted weather condition at the future time coming after the certain period of time from the current time to an airplane to take off from, or land on, the specific zone or to a terminal to enter, or leave from, the specific zone, through the communication unit.

15. The aviation safety-supporting server of claim 13, wherein the information on the atmospheric pressure data at sea level includes variation of atmospheric pressure at sea level obtained by dividing a difference between value of first atmospheric pressure data at sea level at t1 and that of second atmospheric pressure data at sea level at t2 by a time interval (t2–t1) and wherein the map manages the variation of the atmospheric pressure at sea level.

16. The aviation safety-supporting server of claim 13, wherein the machine learning database refers to each of the observation data acquired from at least one of the weather observation apparatuses, Low Level Windshear Alert System (LLWAS), Terminal Doppler Weather Radar (TDWR), Aerodrome Meteorological Observation System (AMOS), and Automated Weather Station (AWS).

17. The aviation safety-supporting server of claim 13, wherein the machine learning database is created by learning the previous observation data observed in the specific zone and airflow data in the specific zone corresponding to the previous observation data.

18. The aviation safety-supporting server of claim 13, wherein at least some of the weather observation apparatuses are at least one of user terminals in which one or more sensors and application programs are installed.

19. An aviation safety-supporting server, comprising:
a communication unit regularly or irregularly obtaining observation data measured from a plurality of weather observation apparatuses that are located in a specific zone and that are placed having relative positioning with each other with a specified spacing; and
a processor preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;
wherein each of the weather observation apparatuses includes:
a sensor unit, on assumption that at least one of all measuring items is E1, E2, . . . , En and a sensor group for measuring the measuring item E1 is G1, that for measuring the measuring item E2 is G2, and that for measuring the measuring item En is Gn, which is configured to include the sensor group G1 having at least three sensors S11, S12, and S13, the sensor group G2 having at least three sensors S21, S22, and S23, and the sensor group Gn having at least three sensors Sn1, Sn2, and Sn3; and
a measuring value-determining unit for obtaining a selected measuring value for the measuring item E1 by referring to the rest of measuring values except a specific measuring value by a specific sensor, that is beyond error range, among at least three sensors S11, S12, and S13 included in the sensor group G1, obtaining a selected measuring value for the measuring item E2 by referring to the rest of measuring values except a specific measuring value by a specific sensor, that is beyond error range, among at least three sensors S21, S22, and S23 included in the sensor group G2, and obtaining a selected measuring value for the measuring item En by referring to the rest of measuring values except a specific measuring value by a specific sensor, that is beyond error range, among at least three sensors Sn1, Sn2, and Sn3 included in the sensor group Gn.

20. The aviation safety-supporting server of claim 19, wherein, when k is an integer as one of numbers from 1 to n, if the specific sensor in the sensor group Gk beyond the error range is replaced with a new sensor and there is a difference between a measuring value obtained by the new sensor and all the measuring values of the existing sensors belonging to the sensor group Gk by more than a certain number of rate, the measuring value-determining unit obtains an adjusted measuring value by adjusting the new measuring value by using all the measuring values of the existing sensors belonging to the sensor group Gk as a reference data.

21. The aviation safety-supporting server of claim 19, wherein the several weather observation apparatuses further includes an alarm unit for providing information to lead a specific sensor beyond error range among at least three sensors Sk1, Sk2, and Sk3 included in the sensor group Gk to be replaced, wherein k is an integer as one of numbers from 1 to n, if the specific measuring value of the specific sensor beyond the error range lasts for more than a certain period of time or is continuously equal to, or exceeds, prefixed ratio within a certain time section.

22. An aviation safety-supporting server, comprising:
a communication unit regularly or irregularly obtaining observation data measured from a plurality of weather observation apparatuses that are located in a specific zone and that are placed having relative positioning with each other with a specified spacing; and a processor preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;

wherein the machine learning database further includes reference data created by learning previous observation data observed in each of multiple zones; and wherein, if a zone where a plurality of weather observation apparatuses are placed is a first zone and a zone adjacent to the first zone is a second zone, the processor prepares and manages the observation data obtained from the first zone as a map, and analyzes the prepared map by referring to the reference data of the machine learning database, thereby predicting weather condition of the second zone at the future time coming after the certain period of time from the current time.

23. An aviation safety-supporting server, comprising:

a communication unit regularly or irregularly obtaining observation data measured from a plurality of weather observation apparatuses that are located in a specific zone and that are placed having relative positioning with each other with a specified spacing; and a processor preparing and managing the obtained observation data as a map by referring to information on the relative positioning, and analyzing the prepared map by referring to machine learning database that is created by learning previous observation data observed in the specific zone, thereby predicting weather condition in the specific zone at a future time coming after a certain period of time from a current time;

wherein the machine learning database further includes reference data created by learning previous observation data observed in each of multiple zones; and wherein the processor supports each of the weather observation apparatuses to be placed at each location where the error rate, calculated by comparing the previously predicted weather information with actually observed weather information at a previous time corresponding to the previously predicted weather information, is analyzed to be equal to or less than a preset scope, by referring to the reference data of the machine learning database.

24. The aviation safety-supporting server of claim 23, wherein, while a weather condition is predicted in the specific zone after each of the weather observation apparatuses is placed, if the error rate exceeds the preset scope, the processor supports each of locations of each of the weather observation apparatuses in the specific zone to be adjusted by referring to the reference data of the machine learning database.

* * * * *